(12) United States Patent
Reimann

(10) Patent No.: US 12,405,347 B2
(45) Date of Patent: Sep. 2, 2025

(54) METHOD FOR DETERMINING DISTANCE BETWEEN A PLURALITY OF OBJECTS

(71) Applicant: LAMBDA:4 ENTWICKLUNGEN GMBH, Hamburg (DE)

(72) Inventor: Rönne Reimann, Hamburg (DE)

(73) Assignee: Lambda:4 Entwicklungen GmbH, Hamburg (DE)

( * ) Notice: Subject to any disclaimer, the term of this patent is extended or adjusted under 35 U.S.C. 154(b) by 323 days.

(21) Appl. No.: 18/251,040

(22) PCT Filed: Nov. 3, 2021

(86) PCT No.: PCT/EP2021/080525
§ 371 (c)(1),
(2) Date: Jun. 23, 2023

(87) PCT Pub. No.: WO2022/096515
PCT Pub. Date: May 12, 2022

(65) Prior Publication Data
US 2023/0375660 A1    Nov. 23, 2023

(30) Foreign Application Priority Data

Nov. 4, 2020   (WO) ................ PCT/EP2020/081014
Nov. 4, 2020   (WO) ................ PCT/EP2020/081015

(51) Int. Cl.
*G01S 5/02* (2010.01)
*G01S 5/00* (2006.01)
*G01S 5/06* (2006.01)

(52) U.S. Cl.
CPC .......... *G01S 5/0289* (2013.01); *G01S 5/0009* (2013.01); *G01S 5/02216* (2020.05); *G01S 5/0226* (2013.01); *G01S 5/06* (2013.01)

(58) Field of Classification Search
CPC .. G01S 5/0289; G01S 5/02216; G01S 5/0009; G01S 5/0226; G01S 5/06
(Continued)

(56) References Cited

U.S. PATENT DOCUMENTS 6,489,923 B1   12/2002   Bevan
7,932,860 B2*   4/2011   Bartlett .................... G01S 5/12
                                                                  342/442
(Continued)

FOREIGN PATENT DOCUMENTS

DE   112014004426   6/2016
EP       0664625   7/1995
(Continued)

OTHER PUBLICATIONS

Synchronization in Wireless Sensor Networks using Bluetooth, Casas et al., Third International Workshop on Intelligent Solutions in Embedded Systems, 2005., ISBN: 3-90246303-1, May 1, 2005.

*Primary Examiner* — Harry K Liu
(74) *Attorney, Agent, or Firm* — Sand, Sebolt & Wernow Co., LPA

(57) ABSTRACT

The invention relates to a method for determining a distance between a plurality of objects. The first object can be, in particular, an authorization means, such as a key fob or a mobile telephone. The problem is solved, inter alia, by means of a method for determining the spacing between a plurality of objects (1, 2), wherein a first of the objects, for example a key, transmits at least one, in particular a plurality of first-object signals with different first-object frequencies, at least one third object (3) transmits at least one, in particular a plurality of third-object signals, and the at least one second of the objects receives the first- and third-object signals of the first object and of the at least one third object and, therefrom or on the basis thereof, the distance between the first object and the second object is determined, char-
(Continued)

acterized in that the third object and/or the first object switches between at least two of the first-object and/or third-object signals such that phase coherence is maintained or such that the phase jump is known.

19 Claims, 1 Drawing Sheet

(58) Field of Classification Search
USPC .................................................. 342/463
See application file for complete search history.

(56) References Cited

U.S. PATENT DOCUMENTS

| | | | |
|---|---|---|---|
| 9,715,019 | B2 | 7/2017 | Larsson |
| 2002/0008615 | A1 | 1/2002 | Heide et al. |
| 2010/0052989 | A1* | 3/2010 | Canoy .................. G01S 5/0284 342/451 |
| 2012/0019413 | A1 | 1/2012 | Fretenburg |
| 2012/0320335 | A1 | 12/2012 | Weeber et al. |
| 2020/0099561 | A1 | 3/2020 | Lee et al. |
| 2020/0118372 | A1* | 4/2020 | Stitt ....................... H04W 12/08 |

FOREIGN PATENT DOCUMENTS

| | | |
|---|---|---|
| EP | 1650581 | 4/2006 |
| EP | 2212705 | 8/2010 |
| EP | 2525238 | 11/2012 |
| EP | 2710398 | 3/2014 |
| EP | 2118675 B1 | 6/2016 |
| EP | 2118675 B8 | 6/2016 |
| EP | 3339890 A1 | 6/2018 |
| EP | 3502736 | 6/2019 |
| EP | 3564703 | 11/2019 |
| EP | 3564706 | 11/2019 |
| EP | 3564707 | 11/2019 |
| WO | 2009067997 | 6/2009 |
| WO | 2010025273 | 3/2010 |
| WO | 2012155993 | 11/2012 |
| WO | 2014130196 | 8/2014 |
| WO | WO-2017202459 A1 * | 11/2017 ........... G01S 5/0226 |
| WO | WO-2018186663 A1 * | 10/2018 ......... H04L 27/2663 |
| WO | 2019238789 | 12/2019 |
| WO | 2020060686 | 3/2020 |
| WO | 2020156939 | 8/2020 |
| WO | 2020165134 | 8/2020 |
| WO | 2022016161 | 1/2022 |
| WO | 2022096091 | 5/2022 |
| WO | 2022096509 | 5/2022 |
| WO | 2022096510 | 5/2022 |
| WO | 2022096511 | 5/2022 |
| WO | 2022096512 | 5/2022 |
| WO | 2022096513 | 5/2022 |
| WO | 2022096514 | 5/2022 |

* cited by examiner

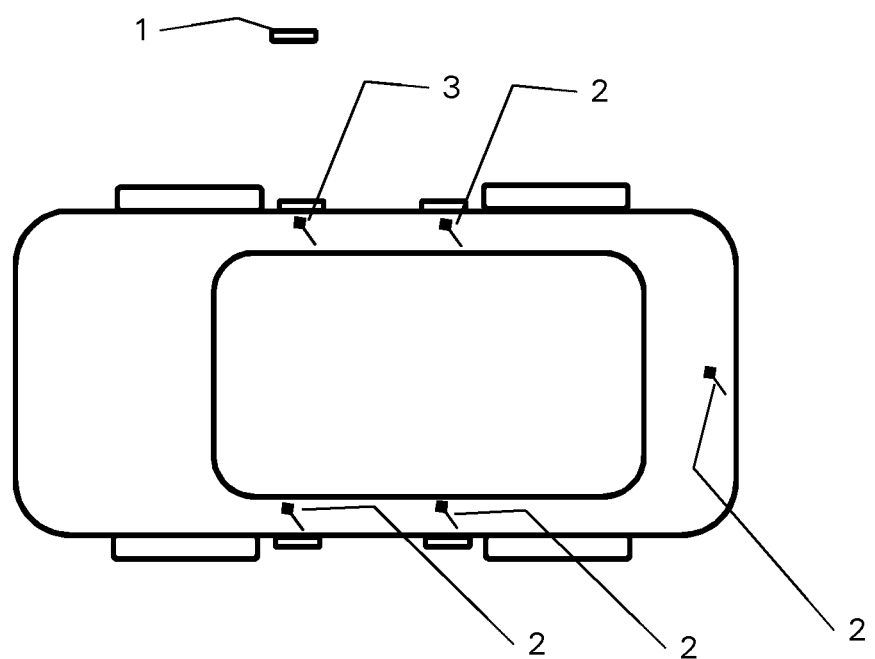

METHOD FOR DETERMINING DISTANCE BETWEEN A PLURALITY OF OBJECTS

TECHNICAL FIELD

The invention relates to a method for determining a distance between two objects with the involvement of a third object.

BACKGROUND ART

Passively determining the location in an anchor network by overhearing the communication of the anchors is known from EP 2710398 B1, in which multiple distances is determined, and the location or the distance to one or more anchors is determined therefrom.

From US 2020/118372 A1, determining the distance to a key is known, using a passive sniffer in a motor vehicle, after communication has been initiated by an active node of the motor vehicle. From a plurality of available antennas, the most suitable are determined on the basis of RSSI values. Antennas with different polarities are used and round-trip times, or phase shifts per frequency at which a round-trip was traveled, are measured, or differences between them are determined. For this purpose, the change in phase over a round-trip at a first frequency is compared to the change in phase for a second round-trip with a second frequency, and the change from the first frequency to the second frequency is considered. Phase-coherent switching between the frequencies is not carried out. Moreover, the phase difference of the switching is not known.

SUMMARY OF THE INVENTION

The problem which the present invention seeks to solve is to determine a distance between two or more, particularly at least three, objects, wherein a first of the objects emits multiple signals at different frequencies, in particular successively, in particular emits one frequency hopping, wherein at least one third object emits signals and the first and/or the second of the objects receives the signals of the first and the at least one third object, and the second object sends signals, in particular one frequency hopping, and the third and/or first of the objects receives the signals of the second object, and the distance between the first and the second object is determined therefrom, in particular, without an indirect determination being necessary, wherein particularly the first, second, and/or third object are or will be time synchronized, and the second and third object are arranged in a fixed relative spatial orientation, in particular.

In particular, the first, second, and/or the at least one third object, are not time-synchronized before execution of the method or are time-synchronized worse than after the execution.

The first object can be, in particular, an authorization means, such as a key fob or mobile phone. The second and third object are, in particular, part of an arrangement to which access is sought and/or granted by means of the authorization means. For example, this arrangement can be a building, a motor vehicle or a barrier, an automated machine or computer.

This is solved inter alia by a method for distance determination, in particular direct distance determination, between two objects, wherein a first of the objects transmits a first-object signal, in particular multiple first-object signals, with different first-object frequencies, and wherein the second object receives the at least one first-object signal of the first object, wherein the second of the objects transmits at least one second-object signal, in particular multiple second-object signals, with different second-object frequencies, wherein at least one third object receives the at least one first-object signal and/or second-object signal, and wherein the at least one third object transmits at least one third-object signal, in particular multiple third-object signals, with different third-object frequencies, and wherein the first and/or second object receives the at least one third-object signal of the third object, and wherein the first and/or the at least one third object receives the at least one second-object signal of the second object, and the distance between the first and the at least one second object, and/or between the first and third object, is determined based on each of the at least one first-object signal, second-object signal, and third-object signal, characterized in that the second object changes phase-coherently between at least two second-object frequencies, and/or changes such that the phase difference upon frequency change, particularly at the first, second, and/or third object is known, and/or the phase difference upon frequency change is made known, in particular to the first, second, and/or third object, and in that the at least one third object changes phase-coherently between at least two third-object frequencies, and/or changes such that the phase difference upon frequency change, particularly at the first and/or second object, is known, and/or the phase difference upon frequency change is made known, in particular to the first, second, and/or third object.

The phase difference when switching between two frequencies generally arises due to technical reasons, but can also be prevented. The switching between two frequencies can be carried out with a short interruption or interruption-free. At the time of the interruption-free change, the phase jumps, or during the change with interruption, the phase of the signals theoretically imagined to continue during the interruption, jumps before and after switching. A defined phase jump exists at the change time-point without interruption, or at a theoretical change time-point during the interruption, particularly in the middle of the interruption and/or at the end of the signal before the interruption or at the beginning of the signal after the interruption. This is the phase difference.

Through signal exchange between the first and second object with first-object and second-object signals having in each case in particular a frequency hopping, time synchronization and/or distance between the first and second object can be determined, . . . and through signal exchange between the first and third object with first-object and third-object signals having in each case in particular a frequency hopping, time synchronization and/or distance between the first and third object can be determined. This can also be carried out in other combinations of objects.

During the signal exchange between the first and second object, the third object in particular overhears the third object. In particular, the at least one object, or all objects, that is/are currently passive, overhears the signal exchange of another pair. Thereby it can, when it knows the time-point and phase jump (which can also be zero) of the frequency change at the transmitter, it can also determine and/or improve its distance and time-synchronization to the transmitter. But even without knowledge of the change time-point, solely due to the information about the magnitude of the phase jump upon switching (which can also be zero), it can determine the distance on the basis of the phase shift, corrected by the phase jump upon switching, and the frequency change, for example using Distance=dPhase shift (f1,f2)/2Pi/dFrequency (f1,f2)
*c where c is the speed of light dPhase shift (f1,f2) is equal to the measured change in phase shift at the receiver by the frequency change from f1 to f2, corrected by the phase jump at the transmitter when switching from f1 to f2, and dFrequency (f1,f2) is equal to the difference between the frequencies f1 and f2

In particular, the change in phase shift is caused by the change of frequency at approximately the same distance. The phase shift is thus caused by the distance. The change in the phase shift caused by the frequency change is caused in that, particularly when both measurements are at approximately equal distance, a different number of wave packets fit within the distance, and consequently the phase shift, which is caused by the distance, ends up being different between the frequencies. This change in the phase shift as a result of the frequency is the phase change caused by the frequency change. In this context, problems result during measuring since in each case, the phase measurement is dependent on a reference, and a, frequently undefined, phase jump can result when switching over to transmit the various frequencies. Switching over for transmitting, and particularly also for receiving, is thus preferably done phase-coherently, i.e., with a phase jump of zero. But determining or knowing the phase jump is also sufficient. Then one can determine the phase change by the frequency change, through the measured phase change corrected by the phase jump upon switchover of the transmitter, and the phase jump upon switchover at the receiver for measuring the measured phase change.

The information about switching time and/or phase jump is, in particular, supplied, for example by predetermination or transmission. In principle, it is irrelevant where the calculations are carried out, whether in the objects, in one object, or in a central . . . computing unit, for example. The measurements and information required for the calculations to be carried out in each case are to be supplied there.

Thus, especially advantageously, the knowledge of the phase jump upon the change in frequency is used to enable a simple measurement or calculation, for example, for correcting the measurement of the change in phase shift. At a phase jump of zero, this knowledge is also used, in particular, in that the measurement of the change in phase shift is used directly to calculate a distance, i.e., it is corrected only by zero.

By this method, high accuracy of the time synchronization and/or distance measurement can be achieved in a simple and rapid signal exchange.

Advantageously, the first, second, and/or at least one third, object are or will be time- and/or clock-cycle-synchronized.

Particularly preferably, a time synchronization is calculated and/or improved between the first and second, and/or between the second and at least one third, and or the first and at least one third, object, on the basis of each of the at least one first, second, and/or third signal.

Especially preferably, the second object receives the at least one third-object signal of the third object and uses it, in particular for time synchronization and/or distance measurement to the third object. Preferably, a distance between the second and at least one third object is calculated on the basis of the first-object, second-object, and/or third-object signals.

Advantageously, first-object, second-object, and/or third-object signals are, or contain, at least one frequency hopping. This augments the accuracy of the method.

In particular, a frequency hopping is understood as transmitting successively on different frequencies. A frequency hopping is to be carried out on both sides when two objects carry out, particularly successively, a frequency hopping.

The frequencies, particularly those of the frequency hopping, lie particularly in a span from 25 to 100 MHz, in particular they completely span such a span. The frequencies, particularly those of the frequency hopping, lie particularly in the range from 2 to 6 GHZ. A spacing in the range from 0.1 to 17 MHz, particularly in the range from 0.5 to 10 MHZ, lies particularly between adjacent but not necessarily consecutive frequencies, particularly of the frequency hopping.

Preferably the first object transmits at least one first-object signal in each case before or after the at least one second signal, and before or after the at least one third signal, in particular of each third object, wherein in particular the first object with the second object and the first object with the at least one third object, in particular each third object, carry out a signal exchange, particularly both-sided frequency hopping, in which particularly each of the two objects involved in the signal exchange transmits in each case in an established and/or predetermined sequence, respectively at least one signal, in each case having different frequencies, wherein in particular the first and the at least one third object change phase-coherently between the different frequencies, and/or change such that the phase difference upon frequency change, particularly at the first object, is known, and/or the phase difference upon frequency change is made known, in particular to the first object.

The accuracy and speed of the method can be further increased thereby.

Advantageously, the at least one first object changes phase-coherently between at least two first-object frequencies, and/or such that the phase difference upon frequency change, particularly at the first, second, and/or third object, is known, and/or the phase difference upon frequency change is made known, in particular to the third and/or second object. Thereby is the accuracy increased and the speed of the method is augmented.

The at least one third object changes between the at least two third-object frequencies, particularly for receiving the first-object signals, wherein these third-object frequencies are then, in particular, identical or at least similar to the respective first-object frequencies, and/or for transmitting at least one, particularly multiple, own third-object signals.

Particularly advantageously, the at least one second object receives the first-object signals and third-object signals of the first and of the at least one third object, and from them or on the basis thereof, the distance between the first and the at least one second object is determined.

Preferably, at least one distance each between the first object and each second and/or third object is determined.

The phase difference or phase jump upon the change between frequencies can be known, for example, in that it is predetermined or can be derived from other known values, for example, the duration of a, particularly directly, preceding, emission at a frequency.

Advantageously, the at least one third-object signal has different third-object frequencies, and/or changes between them.

The signals, particularly first-object and third-object signals, are radio signals, in particular.

In particular, the distance is determined based on frequencies and phases, particularly also amplitudes, of the first-object and third-object signals received at the at least one second object, and on the time differences between the first and third, and between the third and second, object, and particularly also on information about the emitted first-object and/or third-object signals, such as points in time at which certain features were emitted, for example, frequency change and/or their points in time in the first-object and/or third-object signals.

Above and beyond this, optionally information supplied by at least one third object, particularly phase correction information about the at least one received first-object signal, and/or information supplied by the first object, particularly phase correction information, about the at least one third-object signal, can be used.

In particular, the at least one first-object signal and/or the at least one third-object signal has at least one feature per frequency and/or per signal.

Features of the signal are to be understood particularly as changes of the signal, such as change in amplitude, polarization, the emitting antenna (change between antennas), frequency and/or phase. However, aggregated groups of features can also be used, which augment the robustness of the method in some situations. For example, modulated packets or synchronization characters can be used as groups of features.

The problem is also solved by a system having at least one first, one second, in particular a plurality greater than one, in particular, greater than two, second objects, and at least one third object, wherein the first object is configured for emitting first-object signals of different frequency and preferably the at least one third object is configured for emitting third-object signals of different frequency, and all objects are configured for receiving signals, wherein the at least one second and the third object are configured for carrying out a clock-cycle and/or time-synchronization, and wherein the third object is configured for changing phase-coherently between at least two third-object frequencies, in particular of the third-object signals, and/or changing such that the phase difference upon frequency change, particularly at the first, second, and/or third object, is known, and/or the phase difference upon frequency change is made known, in particular to the first, second, and/or third object, and/or wherein the first object is configured for changing phase-coherently between at least two of the first-object frequencies, and/or changing such that the phase difference upon frequency change, particularly at the first, second, and/or third object, is known, and/or the phase difference upon frequency change is made known, in particular to the first, second, and/or third object, and/or wherein the second object is configured for changing phase-coherently between at least two of the second-object frequencies, and/or changing such that the phase difference upon frequency change, particularly at the first, second, and/or third object, is known, and/or the phase difference upon frequency change is made known, in particular to the first, second, and/or third object.

The system is also solved by an access system having at least one access restriction apparatus, wherein the access restriction apparatus is configured for granting and/or denying the access, particularly by means of an access restriction means, further having at least one first, one second, in particular a plurality greater than one, in particular, greater than two, of second objects, and at least one third object, wherein the first object is configured for emitting first-object signals of different frequency, and in particular the third object is configured for emitting third-object signals of different frequency, and all objects are configured for receiving signals, wherein the at least one second and the third object are configured for carrying out a clock-cycle- and/or time-synchronization, and wherein the third object is configured for changing phase-coherently between at least two third-object frequencies, in particular of the third-object signals, and/or changing such that the phase difference upon frequency change, particularly at the first, second, and/or third object, is known, and/or the phase difference upon frequency change is made known, in particular to the first, second, and/or third object, and/or wherein the first object is configured for changing phase-coherently between at least two of the first-object frequencies, and/or changing such that the phase difference upon frequency change, particularly at the first, second, and/or third object, is known, and/or the phase difference upon frequency change is made known, in particular to the first, second, and/or third object, and/or wherein the second object is configured for changing phase-coherently between at least two of the second-object frequencies, and/or changing such that the phase difference upon frequency change, particularly at the first, second, and/or third object, is known, and/or the phase difference upon frequency change is made known, in particular to the first, second, and/or third object, and wherein the system has at least one control that is configured for carrying out the method according to the invention, thereby determining at least one distance between at least one second object and the first object, wherein the access restriction apparatus is configured for not denying the access and/or granting the access if the at least one determined distance between the at least one second object and the first object does not exceed a predetermined distance and/or lies within a predetermined distance range, and/or the determined position of the first object lies within a first and/or outside of a second predetermined range, and/or for denying the access and/or not granting the access when the at least one, particularly all, determined distance(s) between the at least one second object and the first object exceed(s) the predetermined distance and/or lie(s) outside the predetermined distance range, and/or 30 the determined position of the first object lies outside of a first and/or inside of a second predetermined range.

Phase-coherent switching or changing between two frequencies is understood to mean, particularly, that the phase after the switching is known relative to the phase situation before the switching. This is the case when the change of phase when switching is zero or is a previously known value. If switching is done such that the phase difference is known, the difference in the phase situation before and after the switching is known. The value can also be previously known in that it can be derived from previously known values, for example, from the duration of the, particularly directly, preceding emission at a frequency.

For example, this is the case when a defined phase position is always set for switching, and the duration of the emissions since the last switching is measured or known.

Directly ascertaining the distance significantly improves the accuracy and/or speed, compared to the method from EP 2710398 B1.

Especially advantageously, the at least one second object and the first object, and/or the first object and the at least one third object, are or will be time- and/or clock-cycle-synchronized, particularly to 10 ns or better, particularly in the range between 10 ns and 100 ps, time- and/or clock-cycle-synchronized. This augments the accuracy of the method.

The difference in drift between the timers of the first object and at least one second object, or of the at least one second object and at least on third object, can also be determined and used for correction. Numerous methods for this purpose are known from the prior art.

Synchronizing timers in two objects is known, both via cabled and wireless connections. For example, there is the NTP protocol. Within the scope of a Bluetooth connection, too, a synchronization is provided in which each object has a freely running 28-bit clock with a cycle of 3.2 kHz and each object ascertains its offset relative to a central clock, and corrects the offset on a regular basis. In this case, synchronization with an accuracy of approximately 125 ns is achieved. Improved time synchronization is also known, for example, from DE1 1 201 4004426T5 or "Synchronization in radio Sensor Networks Using Bluetooth," Casas et al., Third International Workshop on Intelligent Solutions in Embedded Systems, 2005, ISBN: 3-90246303-1. This can be used for saving energy, for example, in that an object is kept ready to receive only in certain time slices, which are known to the other object, in order to send at corresponding times. Synchronization of the clocks is also still possible, at least with one-sided relatively strong interference on the radio channel, although known distance measurements become impossible or very inaccurate, or take a very long time during such interference. However, synchronization to a cycle of a received signal at the receiver of the signal must be clearly differentiated from the accuracy of a time synchronization. In this case, there is no synchronization of two clocks at two objects, but rather the receiving object is set such that it is synchronized with the incoming signal. The signal time-of-flight does not play a role here, since for that it is irrelevant when the signal was sent and/or how long it took to be transmitted.

Especially advantageously, the at least one second object and the third object are or will be time- and/or clock-cycle-synchronized to 10 ns or better, particularly in the range between 10 ns and 100 ps. This augments the accuracy of the method.

Advantageously, for each first-object and third-object signal received at a second object, a value proportional to its amplitude, and a phase value, are determined, and particularly therefrom, in each case a complex number is determined which is used for determining the distance between the first or third, and the second, object. In particular, a matrix, particularly an autocorrelation matrix, is constructed from a plurality of the complex numbers of the first-object and/or third-object signals, and the distance is determined by means of this and, for example, MUSIC, CAPON, comparison with, distance calculation to, and/or projection onto, the emitting and/or receiving characteristics. In particular, at least one matrix, particularly an autocorrelation matrix, is constructed of first-object signals received at a second object, and/or at least one matrix, particularly an autocorrelation matrix, is constructed of third-object signals received at a second object. Advantageously, the distance calculation occurs by means of eigenvalue, or eigenvector, determination of the at least one autocorrelation matrix and/or Fourier transformation of the complex values. Signals received at the first and/or at a third object can be dealt with analogously.

The phase value is alternatively determined particularly in that with regard to a plurality of pairs of the signals with adjacent frequency, in each case a change in the phase shift scaled to a frequency spacing is calculated, i.e., the derivation of the phase shift is calculated on one of the frequencies, or the frequencies, of the pair, and the values obtained therefrom are used for determining the phase of the complex number at the respective frequency (which belongs to the value that is proportional to the amplitude), particularly by approximate integration via the frequency. When f=0 Hz, it is not necessary to begin with the integration, but rather it is possible and preferred for an offset common to all complex numbers to be used, particularly the lowest frequency of the, particularly the selected, signals.

The phase value is determined particularly from the signal time-of-flight or signal round-trip time, in particular pulse time-of-flight (ToF).

In particular, the scaled phase shift change (dPhase shift (f1, f2)) is obtained by using the formula:

$$dPhase\ shift(f1,f2)=a*(RTT(f3)*dFrequency(f1,f2)\ \text{or}$$

$$dPhase\ shift(f1,f2)=b*(STT(f3)*dFrequency(f1,f2)$$

where dFrequency (f1,f2) is the difference between the frequencies f1 and f2, RTT (f3) is double the signal time-of-flight or is the signal round-trip time (pulse time-of-flight, ToF) between the first and second object, or STT is the one-way signal time-of-flight (pulse time-of-flight, ToF) at one or more frequencies f3, similar to f1 and/or f2, and/or vice versa, and wherein a or b is a constant, in particular, a equals Pi and b equals two-Pi.

The phase shift is a phase shift upon transmission at the frequency from one object to the other, and back, which occurs as a result of the distance. It can be approximately equated with double the phase shift that occurs upon transmission at the frequency from one object to the other as a result of the distance.

Frequencies are regarded as similar particularly when they differ from one another by less than 17 MHz, particularly 10 MHZ, particularly less than 2 MHZ, and/or less than 5%, particularly less than 2%, of the lower frequency.

In particular, the complex value Z is calculated for a frequency, using:

$$Amount(Z(f))=(b*Amplitude(f)+offset)$$

$$Argument(Z(f))=sum(dPhase\ shift(f(n+1),fn))\text{using}\ fn\ \text{from}\ f0\ \text{to}\ f(n+1)=f.$$

Thus the changes of the phase shift are summed, from the lowest frequency to the frequency in question, for which the complex number is to be determined. The lowest frequency is approximately equal for all complex numbers, in particular, it is identical. Moreover, the phase shift changes are, in particular, always to be summed for consecutive frequency pairs in which the higher frequency is approximately equal, in particular, is identical, to the lower of the frequencies of the next pair, thus in particular $$dPhase\ shift\ (f1,f0)+dPhase\ shift\ (f2,f1)+dPhase\ shift\ (f3,f2)+\ldots+dPhase\ shift\ (f,fn)$$

where f=f(n+1)

F0 is approximately equal, in particular is equal, for all complex numbers of a vector and/or of a matrix.

b and offset are constants and, in particular, b is equal to 1, and in particular, offset is equal to 0. Amplitude (f) is the received amplitude measured at frequency f, or a mean value from multiple amplitudes measured at frequency f and/or frequencies similar to f. Alternatively, the power can also be used.

The closer the steps of the real measurement, i.e., of the available fm, the smaller the step size that can be selected in the sequence f0 to f, and therefore, the more accurate the method is.

For example, if measuring is done as follows
F1 STT1 (STT=signal time-of-flight)
F2 STT2

F3 STT3
F4 STT4
. . . . . .
Fn STTn

And if the spacing between the adjacent frequencies is equidistant to the spacing 2d, then F1+2*d=F2, F2+2*d=F3, etc. Then one can form:

$d$Phase shift$(F1+d,F1-d)=k1*2+STT(F1)$, generally $d$Phase shift$(Fn+d,Fn-d)=k1*2+STT(Fn)$, Then, for example, one forms Amount$(Z(fn+d))=(k2*$Amplitude$(Fn)+$offset$)$ and Argument$(Z(fn+d))=$Sum$(d$Phase Shift$(fs+d,fs-d))$ via $fs$ from $F1$ to $Fn$ If the spacings are not equidistant, then one selects as the frequencies fa and fb, particularly as the lowest, a frequency particularly just under the lowest measurement frequency, and then after that frequencies that lie between, particularly in the middle, of the increasing measurement frequencies.

In particular, a matrix, particularly an autocorrelation matrix, is constructed from a plurality of the complex numbers. This is done particularly by constructing a vector from the complex numbers, in which the complex numbers are written in the columns or rows of the vector, and its autocorrelation matrix is constructed. The distance is determined by means of this, for example, by means of known methods, for example MUSIC, CAPON, comparison with, distance calculation to, and/or projection onto, the emitting and/or receiving characteristics. Advantageously, the distance calculation occurs by means of eigenvalue, or eigenvector, determination of the at least one matrix and/or Fourier transformation of the complex values.

Such approaches are advantageous for achieving a reliable determination, particularly with multipath signal propagation.

CAPON, comparison with, distance calculation to, and/or projection onto, the emitting and/or receiving characteristics. Advantageously, the distance calculation occurs by means of eigenvalue, or eigenvector, determination of the at least one matrix and/or Fourier transformation of the complex values.

In certain embodiments, it can be advantageous to arrange the at least one second object and the third object in a fixed relative spatial situation and orientation, for example, when the distance measurement is carried out for the purpose of access control. This facilitates the calculation and augments the reliability.

Advantageously, data is transmitted with the first-object and/or third-object signals, particularly payload data, particularly data such as are necessary for the method according to the invention.

Advantageously, the objects are parts of a data transmission system, particularly a Bluetooth, WLAN, or wireless, data transmission system. Preferably, the first-object and/or third-object signals are signals of the data transmission system, and/or of a data transmission standard, for example a mobile radio standard, WLAN, or Bluetooth, which signals are used for data transmission according to the data transmission standard.

Advantageously, the first-object and/or third-object signals are transmitted over multiple antenna paths, particularly with multiple antennas, particularly successively, transmitted at the transmitting object, and/or received at the receiving object, with multiple antennas.

Preferably, the first object is an authorization means, such as a key fob or mobile phone. Advantageously, the second and third object are part of an arrangement to which access is sought and/or granted by means of the authorization means, wherein the arrangement is particularly a building, a motor vehicle or a barrier, an automated machine and/or computer.

It is preferred that the third object receives the first-object signals and supplies information about the received first-object signals, and this is used in calculating the distance, and/or that the first object receives the third-object signals and supplies information about the received third-object signals, and this is used in calculating the distance. This is advantageous particularly when the time-point of the emission, and/or the phase position during the emission, otherwise would be/are not known in the system.

Especially advantageously, the at least one second object is passive, and/or the at least one second object does not itself transmit any signals or any signals used for distance calculation, and/or the at least one second object does not itself within the scope of the method transmit any signals or any signals used for distance calculation. By this, the method duration can be shortened and the securing can be concealed through the distance determination between the first object and at least one second object, and can be thereby implemented more securely.

Preferably, the method is implemented such that at least one of the transmitting objects (the first and/or at least one third object) switches between signals phase-coherently, particularly without phase jump or with known phase jump, and/or the phase jump is measured locally and considered and/or corrected in the distance determination, and/or at least one of the objects determines a phase correction information from signals of one of the other objects, which phase correction information is used in the distance calculation, in particular, wherein the first object switches phase-coherently between at least two of the first-object frequencies of the first-object signals, and/or the third object switches phase-coherently between at least two of the third-object frequencies of the third-object signals, and/or the third object ascertains at least one phase correction information from the first-object signals, and/or the first object ascertains at least one phase correction information from the third-object signals, and wherein the at least one phase correction information is used in the distance calculation. Such an embodiment, in which additional information about the phase position at the transmitting object is available, allows the method to be implemented more accurately, more robustly, and the calculation to be simplified.

In particular, the first, second, and/or third object also switch phase-coherently for receiving. Alternatively, they measure the phase jump of the phase when the frequency changes, and this phase jump is corrected in the calculation.

Thus preferably, not only the transmitting object switches phase-coherently, but rather also the receiving object does so, particularly a PLL is switched phase-coherently in each object.

Especially preferably, the points in time, and/or the time schedule, of the emissions of the third-object signals and/or of the first-object signals, is predetermined, and/or this/they is/are considered in the distance calculation. In this manner, a more accurate determination and simpler calculation can be achieved.

In a preferred embodiment, the method contains the synchronization of the times and/or clock-cycles in at least one second and third object, particularly wireless or cabled. Preferably, a time- and/or clock-cycle-synchronization and/ or—correction is carried out between the at least one second and third object before, after and/or while the method is carried out. However, the synchronization can also be given or accomplished by other methods. In particular, the differences in the times and/or clock-cycles between at least one second and third object are known and/or synchronous. This augments the accuracy of the method. Preferably, a drift of the clocks of the at least one second and/or third object, or a difference in the drift of the clocks of the at least one second and third object, is also determined and considered in the distance determination. This further augments the accuracy of the method. In a preferred embodiment, the method contains the synchronization, particularly wirelessly, of the times and/or clock-cycles between the first and second object, and/or at least one third and first object, and/or between the second and at least one third object. Preferably, a time- and/or clock-cycle-synchronization and/or—correction is carried out on the basis of the at least one first, second, and/or third signal in each case between the first and second and/or at least one third and first object, and/or between the second and at least one third object, before, after and/or while the method is carried out. Preferably, an at least relative drift of the clocks of the first, second, and/or of the at least one third object is also determined on the basis of the at least one first, second, and/or third signal in each case and considered in the distance determination. This further augments the accuracy of the method.

Time differences and/or drift can also be determined indirectly by triangular relationships. For example, if the time difference and/or drift between X and Y, and between Y and Z, is known, from this the time difference and/or drift between X and Z can be calculated.

Preferably, the second object and/or the at least one third object determines its time and its time drift relative to the first object.

Advantageously, before exchange of the first, second, and third signals, a rough time synchronization is effected between the first, second, and at least one third object, in particular with an accuracy of better than 2 µs, in particular in the range from 0.1 to 2 µs. The time synchronization on the basis of the first, second, and third signals lies particularly in the range from 0.01 to 10 ns, in particular in the range from 0.05 to 5 ns, and/or the accuracy of the drift determination lies in the range from 0.1 to 100 ppb, in particular in the range from 1 to 10 ppb. This can be achieved by the phase-coherent switching or the making-known of the phase jump of the first and third signals, particularly also of the first signals.

In particular, the second anchor (A) and/or the at least one third anchor (B) determine in each case
- dTxA or dTxAB=time difference from A to the first object or B to the first object
- ppbA or ppbB=quartz difference of A or B relative to the first object
- Ts.localA or Ts.localB=start time of the signal exchange in the local time system of the object A or B
- Ts.A or TS.B=start time of the signal exchange in the time system of the object A or B
- ToffMess(n)=time offset of each measurement at frequency n from the start time of the signal exchange
- F(n)=radiated n. frequency in the signal exchange, relative to the quartz of the transmitter The received phases are dependent on the phase positions upon transmitting and on the distance and on the time delay of the measuring to the transmitting object, and on the difference in drift of the oscillators in the transmitter and receiver. With the knowledge of the drift, the temporal aspect can be corrected of a phase error caused by the time inaccuracy/drift.

Thus the absolute time difference in object A to the time of the measurement of the first signal can be expressed with:

$$dT(n)=dTxA+(Ts.\text{local}+\text{ToffMess}(n)-Tx)*ppbA$$

The relative time difference then results as:

$$dRT(n)=dT(n)-(Ts.A-Ts.\text{local})$$

And the phase correction as:

$$\text{Phcorrection}=dRT(n)*F(n)$$

The drift of the oscillators can also be corrected accordingly and improves the accuracy further.

The corrected phase measurements can then be used directly for one-sided distance measurement. While a correction is not absolutely necessary, it does improve the accuracy. Even if the starting phase position of the first frequency at the transmitter is not to be known, a distance can be determined by the known change in the phase upon the switching at the transmitter by the phase shift, for example, using $$\text{Distance}=(\text{phase shift between two frequencies})/2Pi/(\text{difference between the two frequencies})*c$$

It should be noted that an ambiguity arises here, from $$\text{Distance}=c/(\text{difference between the two frequencies})$$

where c is the speed of light

Especially advantageously, by passively overhearing the signal exchange between the first and at least one third object, the second object also uses the signals of the signal exchange between the first and at least one third object for determining its time, time drift, and/or distance to the first and/or at least one third object. Especially advantageously, by passively overhearing the signal exchange between the first and second object, the at least one third object also uses the signals of the signal exchange between the first and second object for determining its time, time drift, and/or distance to the first and/or second object.

Especially advantageously, the distance between the at least one second object and the first object is determined, without determining the distance between the first and third object in order to do so, and/or the distance between the first object and the at least one second object is determined independently of the distance between the first and third object. This augments the speed and accuracy of the method.

Especially preferably, the method is carried out with a plurality, particularly with a common plurality greater than one, particularly greater than two, particularly greater than four, of second objects, and common first and particularly common second and third object(s), wherein it is preferable for the calculated distances, particularly between the first and each of the plurality of second objects, to be used to carry out a mapping and/or position determination of the first object. By using multiple objects, particularly second and/or third objects that are arranged spatially distanced from one another, the reliability and accuracy can be augmented, and a position-finding is enabled, such as by means of triangulation.

Preferably, the method is carried out multiple times, wherein the at least one second and at least one third object can also switch their roles, however the first object is common to all executions of the method and/or is constant. For example, of a plurality of objects, one changing part of the plurality can always be second objects, and another part can be third objects.

Preferably, the plurality of second objects has a fixed location and/or orientation to one another, which is, particularly, known and/or determined by radio location. This allows for simple triangulation for locating the first object, for example.

Advantageously, the method is executed by means of a system, and/or access system, according to the invention. Advantageously, the system or access system is configured for implementing one or more advantageous embodiment(s) of the method, and has an appropriately configured control for this purpose.

Advantageously, at no time does the bandwidth of the signals exceed 50 MHZ, particularly 25 MHz. Consequently energy can be saved, interference with other processes can be prevented, and simple components can be used compared to broadband methods.

Advantageously, the signals are transmitted over multiple antenna paths, particularly with multiple antennas, particularly successively, transmitted at the transmitting object, and/or received at the receiving object, with multiple antennas.

Preferably the first and/or third object transmits the signals on multiple frequencies successively and/or consecutively, in particular directly consecutively, and/or the first and third object transmit consecutively in alternating fashion.

The calculation of the distance is done as follows, for example:

In dependence upon the carrier frequency, the phases/amplitudes measured at the second object from the first object are corrected by the expected/calculated error from the known time shift between the objects, and by the time drift of the two system clocks of the objects. These values can then be evaluated, for example, using an FFT. Vectors can also be constructed (e.g., for different antenna paths), from which an autocorrelation matrix (ACM) is created, and high-resolution methods, such as MUSIC or CAPON, can be used to search for the distances in this ACM.

Following the premise of phase-coherent frequency switching at the first and third object, it is possible to proceed in the following manner, otherwise the calculation becomes somewhat more complicated:

In particular, after ascertaining the exact time differences and time drift between the third and first object, and between the second and third object, the sufficiently exact time difference between the first and second object can be calculated at every time for a limited timeframe (e.g., 100 ms).

At the second object, the IQ values or phases/amplitudes are determined on at least 2 (up to n) frequencies (F0 to Fn) of a signal of the first object.

At the second object, particularly the IQ values or phases/amplitudes are determined on at least 2 (up to n) frequencies (F0 to Fn) of a signal of the at least one third object.

For this purpose, for example, if the switching time points between the frequencies F0 to Fn', and/or F0 to Fn, and/or their relationship in time, is known, the second object, on the basis of the time synchronization with, at least, the third object, can determine the switching times between the frequencies in F0' to Fn'. If the times at which the switching was received are measured, times-of-flight, particularly pulse times-of-flight (ToF), can be directly determined therefrom.

However, the switching with known phase jump or without phase jump also allows the frequency shift to be directly measured via the frequency change. This applies to both signals of the first object, as well as of the at least one third object, which are received at the second object. By this alone, it is already possible for the second object to determine in a phase-based manner (phase-based ranging, PBR) both the distance to the first object, as well as to the at least one third object, for example using $$\text{Distance}=d\text{Phase shift}(f1,f2)/2Pi/d\text{Frequency}(f1,f2)*c$$

where c is the speed of light, and dPhase shift (f1,f2) is equal to the measured phase change at the receiver by the frequency change from f1 to f2, corrected by the phase jump at the transmitter when switching from f1 to f2, and dFrequency (f1,f2) is equal to the difference between the frequencies f1 and f2.

If the switching time-points of the first object and of the at least one third object have a time relationship that can be derived, ascertained, communicated, and/or predetermined, which is preferred, further information for improving the measurement can be obtained thereby. If, for example, the switching time-points between frequencies of the at least one third object occurred are known, and/or made known, to the at least second object, which is preferred, from the relation of the switching time-points it is possible to determine the switching time-points of the frequencies of the first object, at least in dependence upon the distance between the first object and at least one third object, which results in further improvement.

If the switching time-points between frequencies of the first object are known, and/or made known, to the at least second object, which is preferred, it can directly determine the time-of-flight, in particular pulse time-of-flight (ToF), and thus the distance, of the signal from the first to the second object. But even based solely on the frequency switch of the emission of the signals of the first object, without or with a known phase jump, the distance can be determined directly by the second object, for example, as explained above, using the following:

$$\text{Distance}=d\text{Phase shift}(f1,f2)/2Pi/d\text{Frequency}(f1,f2)*c$$

The measured phase shifts can be adjusted to the time differences and frequency differences (incl. drift) to augment the accuracy. It is sufficient for the drift to be considered approximately. Determining this is known from the prior art and can be done for the distance determination, for example, by determining the time differences at different times, for example before and after the signal exchange.

Generally, however, the time synchronization and distance calculation can be done together through an equation system. This is enabled in that switching is done phase-coherently or with knowledge of the phase jump.

For example, to resolve multipathing, the individual phases, with the associated measured amplitudes as complex values, for example, can be input into a Fourier transformation, or a spectral estimate can be performed in matrices using super-resolution methods, such as MUSIC or CAPON.

BRIEF DESCRIPTION OF THE DRAWINGS

FIG. 1 schematically illustrates a vehicle with multiple second objects and a third object arranged therein.

DETAILED DESCRIPTION

FIG. 1 shows, purely by way of example and not in a limiting manner, a vehicle with multiple second objects (2) and a third object (3) arranged therein, as well as a first object (1) implemented as a key fob. In carrying out the method, the respective distances between the first object and each second object are determined. If the time synchronization between the third and second object takes place in a cabled manner, for example, the second objects can be implemented without a transmitter and thus can be passive or non-locatable.

An example in which at least two anchors (A1, . . . An) and a key (key) can look as follows. In this context, two of the anchors from A1 to An are second and third object At least one pair of anchors from A1 to An, including second and third object, in particular the pairs of first object/second object and first object/third object, exchange first-object, second-object, and/or third-object signals at various frequencies (20 to 50 frequencies, for example) and switch, at least in pairs, between the frequencies phase-synchronously, or such that the phase jump is known. This can be done, for example, in that it is conveyed to the partner.

Moreover, one of the objects of each pair preferably sends the measured phases to at least the other from the pair or to a central location, for example, third object sends its phase measurements to first object; this can be done by radio and/or cable-based.

Key, i.e., first object, and second object exchange first-object and second-object signals at multiple various frequencies (in the range from 20 to 100 frequencies, for example) and switch, at least in pairs, between the frequencies phase-synchronously or such that the phase jump is known. This can be done, for example, in that it is conveyed to the partner.

Key sends its phase measurements to first object. Now the first object can calculate the time synchronization between the first object and key, and the distance between first object and key. If the first object also forwards its measurements and/or those of the key to the third object, the third object can also perform a time synchronization and a distance calculation of its distance to the key.

This can be performed with any desired number of third objects. In particular, the second object and the at least one third object have a fixed spatial arrangement to one another, while the key is mobile. This allows the time synchronization and the distance determination between second and third object(s) to be steadily improved.

Mathematically it makes no difference when the individual signals are transmitted, in particular the signals that A1 exchanges with key can also be used by A2 for the time synchronization.

It is even sufficient if the objects/anchors (first object(s), second object(s), and third object(s)) in each case execute pair-wise a normal tone exchange and/or hopping for the ranging, in particular in each case with the key (first object), and change the frequency phase coherently or with known phase jump. Thus, overall, enough tones are transmitted and heard to also calculate a time synchronization between ALL partners (in each case between the key and each of the anchors) aside from the distance determination.

Due to the fact that the other objects overhear a signal exchange in a pair of objects and can measure the phase changes with frequency changes of the transmitter, during the time they are passive they can also improve their time synchronization and/or distance determination to the objects of the objects currently executing the signal exchange.

The invention claimed is:

1. A method for distance determination between two objects, wherein a first object of the two objects transmits at least one first-object signal with different first-object frequencies, and wherein the second object receives the at least one first-object signal of the first object, wherein the second object of the two objects transmits at least one second-object signal with different second-object frequencies, wherein at least one third object receives the at least one of the at least one first-object signal and the second-object signal, and wherein the at least one third object transmits at least one third-object signal with different third-object frequencies, and wherein at least one of the first object and the second object receives the at least one third-object signal of the third object, and wherein the first object receives the at least one second-object signal of the second object, wherein the distance between the at least one of the first object and the second object, and the first object and the third object is determined based on each of the at least one first-object signal, second-object signal, and third-object signal, wherein the second object in the second-object signal changes phase-coherently between at least two second-object frequencies, or changes such that a phase difference upon frequency change is known, or the phase difference upon the frequency change is made known, and in that the at least one third object in the third-object signal changes phase-coherently between at least two third-object frequencies, or changes such that the phase difference upon frequency change is known, or the phase difference upon frequency change is made known.

2. The method according to claim 1, wherein the at least one of the first object, the second object, and at least one third object are clock-cycle- or time-synchronized, or wherein a time synchronization is calculated or improved between the first object and the second object, or between the second object and the at least one third object, or between the first object and the at least one third object, on the basis of each of the at least one first-object signal, the second-object signal, or the third-object signal.

3. The method according to claim 1, wherein the second object receives the at least one third-object signal of the third object, or wherein a distance between the second object and the at least one third object is calculated on the basis of one or more of the first-object signal, the second-object signal, and the third-object signal.

4. The method according to claim 1, wherein the first object transmits at least one first-object signal in each case before or after the at least one second-object signal, and before or after the at least one third-object signal.

5. The method according to claim 4, wherein the first object with the second object and the first object with at least one third object carry out a signal exchange in which each of the two objects involved in the signal exchange transmits in each case in an established or predetermined sequence, respectively, at one signal, in each case having different frequencies, and wherein the first object in the at least one first object signal or the at least one third object in the at least one third object signal change(s) phase coherently between the different frequencies, or change(s) such that the phase difference upon frequency change is known, or the phase difference upon frequency change is made known.

6. The method according to claim 1, wherein the at least one first object in the first-object signal changes phase-coherently between at least two first-object frequencies, or changes such that the phase difference upon frequency change is known, or the phase difference upon frequency change is made known.

7. The method according to claim 1, wherein in each case for at least one received first-object signal, second-object signal, and/or third-object signal a value proportional to its amplitude, and a phase value, are determined.

8. The method according to claim 7, wherein the value proportional to its amplitude and the phase value, are determined per received frequency or first-object, second-object, or third-object frequency, or every frequency of the frequency hopping.

9. The method according to claim 8, wherein from the determination of the value proportional to its amplitude and the phase value in each case a complex number is determined which is used for determining the distance between the first object and the second object.

10. The method according to claim 9, wherein the determination of the complex number is done by creating a vector from the complex numbers or by creating an autocorrelation matrix.

11. The method according to claim 1, wherein the second object and the at least one third object are arranged in a fixed relative spatial position or orientation, and wherein the first object is an authorization means, such as a key fob or mobile phone, and wherein the second object and the at least one third object are part of an arrangement to which access is sought or granted by means of the authorization means.

12. The method according to claim 1, wherein the at least one third object receives the at least one second-object signal or the first-object signal and supplies information about the received at least one received second-object signal or the first-object signal and uses the information in calculating the distance, or wherein the first object receives the at least one second-object signal or the third-object signal and supplies information about the received at least one second-object signal or the third-object signal and uses the information in calculating the distance, wherein the second object receives the at least one first-object signal or the third-object signal and supplies information about the received at least one first-object signal or the third-object signal and uses the information in calculating the distance.

13. The method according to claim 1, wherein at least one of the transmitting objects, the first object or the at least one third object, changes between frequencies phase-coherently, or at least one of the objects determines a phase correction information from signals of one of the other objects, which phase correction information is used in the distance calculation.

14. The method according to claim 13, wherein the first object switches phase-coherently between at least two of the first-object frequencies, or the third object switches phase-coherently between at least two of the third-object frequencies, or the third object ascertains at least one phase correction information from the first-object signals, or the first object ascertains at least one phase correction information from the third-object signals, and wherein the at least one phase correction information is used in the distance calculation.

15. The method according to claim 1, wherein time-points or a time schedule of the emissions of the at least one second-object signal, the third-object signal, and the first-object signal, or its features, are predetermined, or are known or made known to the first object, the second object, or the third object, or are considered in the distance calculation, and wherein the method includes the synchronization, wirelessly or cabled, of the times or clock-cycles between the first object and the second object, or between the second object and the third object, or between the first object and the third object.

16. The method according to claim 1, wherein the distance between the first object and the second object is determined, without determining the distance between the first object and the third object or wherein the distance between the first object and the second object is determined independently of the distance between the first object and the third object.

17. The method according to claim 1, carried out with a plurality of third objects and a common first object, and wherein the calculated distances are used for carrying out a mapping or position determination of the first object.

18. A system having a first object, a second object, and at least one third object, wherein the first object is configured for emitting at least one first-object signal with different frequencies, and wherein all of the first object, the second object, and the at least one third object are configured for receiving signals, wherein the second object and the at least one third object are configured for carrying out a clock-cycle- or time-synchronization, and wherein at least one of the at least one third object, the first object, and the second object is configured for changing phase-coherently between at least two of the third-object frequencies, the first-object frequencies, and the second-object frequencies, respectively, or changing such that the phase difference upon frequency change is known, or the phase difference upon frequency change is made known and wherein the system has at least one control that is configured for carrying out the method according to claim 1, and for determining thereby at least one distance between the second object and the first object.

19. An access system having at least one access restriction apparatus, wherein the access restriction apparatus is configured for granting or denying the access, further comprising a first object, a second object, and at least one third object, wherein the first object is configured for emitting at least one first-object signal with different frequencies, and wherein all of the first object, the second object, and the at least one third object are configured for receiving signals, wherein the second object and the at least one third objection or the first object are configured for carrying out a clock-cycle- or time-synchronization, and wherein the at least one of the third object, the first object, and the second object is configured for changing phase-coherently between at least two of the third-object frequencies, of the first object frequencies, or of the second object frequencies, respectively, or changing such that the phase difference upon frequency change is known, or the phase difference upon frequency change is made known and wherein the system has at least one control that is configured for carrying out the method according to claim 1 and for determining thereby at least one distance between the second object and the first object, wherein the access restriction apparatus is configured for not denying the access or granting the access if the at least one determined distance between the second object and the first object does not exceed a predetermined distance or lies within a predetermined distance range, or the determined position of the first object within a first predetermined range or outside of a second predetermined range, or for denying the access or not granting the access when the at least one determined distance between the second object and the first object exceeds the predetermined distance or lies outside the predetermined distance range, or the determined position of the first object lies outside of the first predetermined range or inside of the second predetermined range.

\* \* \* \* \*